(12) United States Patent
Sakurai et al.

(10) Patent No.: US 7,250,969 B2
(45) Date of Patent: Jul. 31, 2007

(54) DEFECTIVE IMAGE COMPENSATION SYSTEM AND METHOD

(75) Inventors: Junzo Sakurai, Tokyo (JP); Takayuki Kijima, Tokyo (JP)

(73) Assignee: Olympus Corporation, Tokyo (JP)

( * ) Notice: Subject to any disclaimer, the term of this patent is extended or adjusted under 35 U.S.C. 154(b) by 791 days.

(21) Appl. No.: 10/158,327

(22) Filed: May 29, 2002

(65) Prior Publication Data

US 2002/0191101 A1    Dec. 19, 2002

(30) Foreign Application Priority Data

May 31, 2001 (JP) .............................. 2001-165124
May 14, 2002 (JP) .............................. 2002-138044

(51) Int. Cl.
*H04N 9/64* (2006.01)

(52) U.S. Cl. .................................. 348/246; 348/230.1

(58) Field of Classification Search ................. 348/246, 348/220.1, 320, 305, 247, 243, 244, 245, 348/251, 260, 312, 230.1, 222.1, 228.1; 382/261, 382/260, 262, 264, 266, 272, 273, 274, 275, 382/313; 358/518, 443
See application file for complete search history.

(56) References Cited

U.S. PATENT DOCUMENTS

| | | | | |
|---|---|---|---|---|
| 5,008,739 A | * | 4/1991 | D'Luna et al. | ............. 348/246 |
| 5,392,070 A | * | 2/1995 | Endo et al. | ................. 348/247 |
| 5,696,847 A | * | 12/1997 | Trew | .......................... 382/254 |
| 5,930,167 A | * | 7/1999 | Lee et al. | .............. 365/185.03 |
| 6,529,236 B1 | * | 3/2003 | Watanabe | ................ 348/230.1 |
| 6,700,608 B1 | * | 3/2004 | Fukuda | ........................ 348/243 |
| 6,819,359 B1 | * | 11/2004 | Oda | ............................ 348/247 |
| 2002/0141655 A1 | * | 10/2002 | Niemi et al. | ................ 382/276 |
| 2002/0181762 A1 | * | 12/2002 | Silber | ......................... 382/154 |
| 2002/0196354 A1 | * | 12/2002 | Chang et al. | ............... 348/246 |
| 2003/0214706 A1 | * | 11/2003 | Maddison | ................... 359/368 |
| 2003/0234867 A1 | * | 12/2003 | Fujita et al. | ............. 348/207.1 |
| 2004/0080661 A1 | * | 4/2004 | Afsenius et al. | ........... 348/345 |

FOREIGN PATENT DOCUMENTS

| | | |
|---|---|---|
| JP | 60101279 | 5/1985 |
| JP | 60147560 | 7/1985 |

(Continued)

*Primary Examiner*—Vivek Srivastava
*Assistant Examiner*—Nelson D. Hernandez
(74) *Attorney, Agent, or Firm*—Volpe and Koenig, P.C.

(57) ABSTRACT

A CCD imaging element 12 has a two-dimensional array of a plurality of pixels in the horizontal and vertical directions. A read-out mode switching circuit switches a full read-out mode and a horizontal line thinning-out mode with respect to the imaging element 12 one over to the other. A read-out circuit reads out an image signal from the imaging element 12. A defective pixel compensation circuit 15 executes compensation for defective pixels on the basis of adjacent pixel signals thereto. In the full read-out mode, the defective pixel compensation is executed by using four normal pixels adjacent to the defective pixel in the horizontal and vertical line directions. In the thinning-out read-out mode, the defective pixel compensation is executed by using two normal pixels adjacent to and on opposite sides of a horizontal line defective pixel in the horizontal line direction, said two normal pixels lying along the same horizontal line as said defective pixel.

4 Claims, 3 Drawing Sheets

FOREIGN PATENT DOCUMENTS

| JP | 03234741 | 9/1991 |
| JP | 04187674 | 6/1992 |
| JP | 04203118 | 7/1992 |
| JP | 04271205 | 9/1992 |
| JP | 05000530 | 1/1993 |
| JP | 08045166 | 3/1996 |
| JP | 10220165 | 8/1998 |
| JP | 11028761 | 2/1999 |

* cited by examiner (a)  (b)

DEFECTIVE IMAGE COMPENSATION SYSTEM AND METHOD

BACKGROUND OF THE INVENTION

This application claims benefit of Japanese Patent Applications Nos. 2001-165124 filed on May 31, 2001 and 2002-138044 filed on May 14, 2002, the contents of which are incorporated by reference thereto.

The present invention relates to defective image compensation systems and methods, which are assembled in or applied in combination to many solid-state imaging systems applied to digital cameras and television cameras.

In solid-state imaging elements constituted by CCDs or like semiconductor elements, it is difficult to uniformly form semiconductor crystal over a whole image pick-up area thereof. This gives rise to local formation of crystal defects, and these defective portions lead to a phenomenon of thermal charge generation, that is, these portions become defective pixels. Furthermore, in constructing a solid-state element in conformity to, for instance, a ⅔ inch image format, one pixel has a size of substantially 5 μm on each square side. Such minute pixels become defective pixels merely due to slight dust attachment to their surface.

In addition, the output of a defective pixel of the type, in which a fixed bias is superimposed on an electric signal corresponding to the incident light intensity, appears as a white point on the monitor screen. On the other hand, the output of a defective pixel of low light sensitivity appears as a black point on the monitor screen.

The compensation for defective pixels is usually executed on the basis of data of four pixels located around each defective pixel. More specifically, the average value of signals of four pixels adjacent to the defective pixel in horizontal and vertical line directions is substituted for the image output data of the defective pixel position. This compensation is based on an assumption that the data of the adjacent pixels have high correlation to the defective pixel position. Actually, such a process hardly leads to resolution deterioration.

In the case of the color imaging element, the term "adjacent to" has a meaning pertinent to pixels, which are pixels of the same color as the color of the defective pixel (i.e., pertinent color to the position of the defective pixel) and adjacent to the defective pixel in the horizontal or vertical direction. Also, although pixels which are physically closest to the defective pixel are usually of different colors from the color of the defective pixel, the term "adjacent to" is applied to such physically closest pixels of the same color as the defective pixel.

In the meantime, there are strong demands for improving the electronic image resolution, and the number of imaging element pixels is increasing year by year. However, in the recording or reproduction of moving images or during monitoring of the field with an electronic view-finder (EVF), cases happen, in which particular pixels less in number than the full imaging element pixel number are read out from the imaging element, that is, pixel outputs are read out by thinning out pixels fully or partly. Even in such cases, if defective pixels are contained among the read-out subject pixels, the defective pixel compensation process becomes necessary. In the case of the read-out by thinning out pixels, adequate compensation processing can not be obtained by executing the process with the same algorithm as that applied when reading out the full pixel outputs. This is so because the pixels in horizontal lines vertically adjacent to the horizontal line, to which a defective pixel belongs, have poor correlation property with respect to the defective pixel due to their spaced-apart physical positions from the defective pixel, as will be readily understood in connection with the case of reading out pixel outputs by thinning out pixels in every other horizontal line.

Heretofore, various techniques concerning the pixel defects and the compensation thereof have been proposed. For example, Japanese Patent Laid-Open No. 61-261974, Japanese Patent Laid-Open No. 6-6643, Japanese Patent Laid-Open No. 6-30425, Japanese Patent Laid-Open No. 6-205302 and so forth disclose techniques concerning the detection or determination of defective pixels. As for the defective pixel compensation process, Japanese Patent Laid-Open No. 62-8666 discloses substitution for defective pixel on the basis of normal pixel outputs. Also, Japanese Patent Laid-Open No. 5-236358 discloses compensation circuit and driving thereof with defective pixel compensation pulses. Furthermore, Japanese Patent Laid-Open No. 2000-59799 discloses defect determination method and compensation by substitution. Still further, Japanese Patent Laid-Open No. 2000-228774 discloses compensation using data of lines with relatively less defective pixels. Yet further, Japanese Patent No. 2667938 discloses interpolation of defective pixels in a printer.

Japanese Patent Laid-Open No. 9-247540 proposes techniques, in which, for the case of reading out photoelectric conversion outputs of pixels formed as two-dimensional array on an image pick-up area of an imaging element either by thinning out or from an area restricted with respect to the full image pick-up area, a plurality of different data tables concerning the read-out modes (i.e., data at defective pixel position and positions of normal pixels used for substitution compensation) are preliminarily preserved to permit the defective pixel compensation process to be executed in dependence on a proper table data of which are selectively applied as required, thus reducing the process time.

A digital camera or the like may also have a function of switching two read-out modes, one for fully reading out the pixel outputs of imaging element and the other one for reading out outputs by thinning out the pixels. For example, the former mode is set when obtaining intrinsic recording subject images, and the latter mode is set when continuously monitoring motion images on EVF for selecting the composition or field.

As noted above, in the case of the read-out by thinning out pixels, adequate compensation process can not be obtained by executing the process with the same algorithm as that applied when reading out the full pixel outputs.

However, the above technique proposals all lack the recognition of the technical intent of permitting adequate defective pixel compensation process in correspondence to the switching of the full read-out mode and the thinning-out read mode, and have no mention of means for realizing such intent.

SUMMARY OF THE INVENTION

The present invention was made in view of the above background, and has an object of providing a system and a method capable of adequate defective pixel compensation process in correspondence to the switching of the full read-out mode and the thinning-out read-out mode.

According to an aspect of the present invention, there is provided a defective pixel compensation system comprising: a photoelectric conversion part having a two-dimensional array of pixels formed on an image pick-up area in the horizontal and vertical line directions; a read-out circuit capable of being set in either a first read-out mode, in which it fully reads out photoelectric conversion outputs of all pixels in the photoelectric conversion part, or a second read-out mode, in which it reads out outputs of pixels in either horizontal or vertical line direction array intermittently while reading out outputs of all pixels in the other line direction array so as to obtain outputs from selected and limited pixels thereof, for reading out photoelectric conversion outputs from pertinent pixels in either mode; and a defective pixel compensation part having such a construction that when the read-out circuit part is set in the first read-out mode for reading out photoelectric conversion outputs, it executes a predetermined defective pixel compensation process for defective pixel outputs on the basis of the photoelectric conversion outputs of pixels including pixels adjacent to the defective pixel in the horizontal and vertical line directions, and when the read-out circuit part is set in the second read-out mode for reading out photoelectric conversion outputs of limited pixels, it executes a predetermined defective pixel compensation process for defective pixel outputs on the basis of photoelectric conversion outputs of pixels including adjacent pixels to the defective pixel in the other line direction with limiting the line directions of the two-dimensional pixel array.

According to another aspect of the present invention, there is provided a defective pixel compensation system comprising: a photoelectric conversion part with a two-dimensional array of a plurality of pixels corresponding to predetermined colors, respectively, formed on an image pick-up area in horizontal and vertical line directions; a read-out circuit capable of being set in either a first read-out mode, in which it fully reads out photoelectric conversion outputs of all pixels in the photoelectric conversion part, or a second read-out mode, in which it reads out outputs of pixels in either horizontal or vertical line direction array intermittently while reading out outputs of all pixels in the other line direction array so as to obtain outputs from selected and limited pixels thereof for reading out photoelectric conversion outputs from pertinent pixels in either mode; and a defective pixel compensation process part having such a construction that when the read-out circuit part is set in the first read-out mode for reading out photoelectric conversion outputs, it executes a predetermined defective pixel compensation process for defective pixel outputs on the basis of the photoelectric conversion outputs of pixels including pixels adjacent to a pixel of a color pertinent to the defective pixel in the horizontal and vertical line directions, and when the read-out circuit part is set in the second read-out mode for reading out photoelectric conversion outputs of limited pixels, it executes predetermined defective pixel compensation process for defective pixel outputs on the basis of photoelectric conversion outputs of pixels including adjacent pixels to a pixel of a color pertinent to the defective pixel in the other line direction with limiting the line directions of the two-dimensional pixel array.

According to another aspect of the present invention, there is provided a defective pixel compensation method for an imaging system having a photoelectric conversion part with a two-dimensional array of a plurality of pixels formed on an image pick-up area in the horizontal and vertical line directions, comprising the steps of: setting a read-out circuit in either a first read-out mode, in which the read-out circuit fully reads out photoelectric conversion outputs of all pixels in the photoelectric conversion part, or a second read-out mode, in which the read-out circuit reads out outputs of pixels in either horizontal or vertical line direction array intermittently while reading out outputs of all pixels in the other line direction array so as to obtain outputs from selected and limited pixels thereof for reading out photoelectric conversion outputs for pertinent pixels in either mode; and causing a defective pixel compensation part to execute, when the read-out circuit part is set in the first read-out mode for reading out photoelectric conversion outputs, a predetermined defective pixel compensation process for defective pixel outputs on the basis of the photoelectric conversion outputs of pixels including pixels adjacent to the defective pixel in the horizontal and vertical line directions, while executing, when the read-out circuit part is set in the second read-out mode for reading out photoelectric conversion outputs of limited pixels, a predetermined defective pixel compensation process for defective pixel outputs on the basis of photoelectric conversion outputs of pixels including adjacent pixels to the defective pixel in the other line direction with limiting the line directions of the two-dimensional pixel array.

According to a further aspect of the present invention, there is provided a defective pixel compensation method for an imaging system having a photoelectric conversion part with a two-dimensional array of a plurality of pixels formed on an image pick-up area in the horizontal and vertical line directions, comprising the steps of: setting a read-out circuit in either a first read-out mode, in which the read-out circuit fully reads out photoelectric conversion outputs of all pixels in the photoelectric conversion part, or a second read-out mode, in which the read-out circuit reads out outputs of pixels in either horizontal or vertical line direction array intermittently while reading out outputs of all pixels in the other line direction array so as to obtain outputs from selected and limited pixels thereof for reading out photoelectric conversion outputs for pertinent pixels in either mode; and causing a defective pixel compensation part to execute, when the read-out circuit part is set in the first read-out mode for reading out photoelectric conversion outputs, a predetermined defective pixel compensation process for defective pixel outputs on the basis of the photoelectric conversion outputs of pixels including adjacent pixels to a pixel of a color pertinent to the defective pixel in the horizontal and vertical line directions, while executing, when the read-out circuit part is set in the second read-out mode for reading out photoelectric conversion outputs of limited pixels, a predetermined defective pixel compensation process for defective pixel outputs on the basis of photoelectric conversion outputs of pixels including adjacent pixels to a pixel of a color pertinent to the defective pixel in the other line direction with limiting the line directions of the two-dimensional pixel array Other objects and features will be clarified from the following description with reference to attached drawings.

PREFERRED EMBODIMENTS OF THE INVENTION

Preferred embodiments of the present invention will now be described with reference to the drawings.

Figure 1:
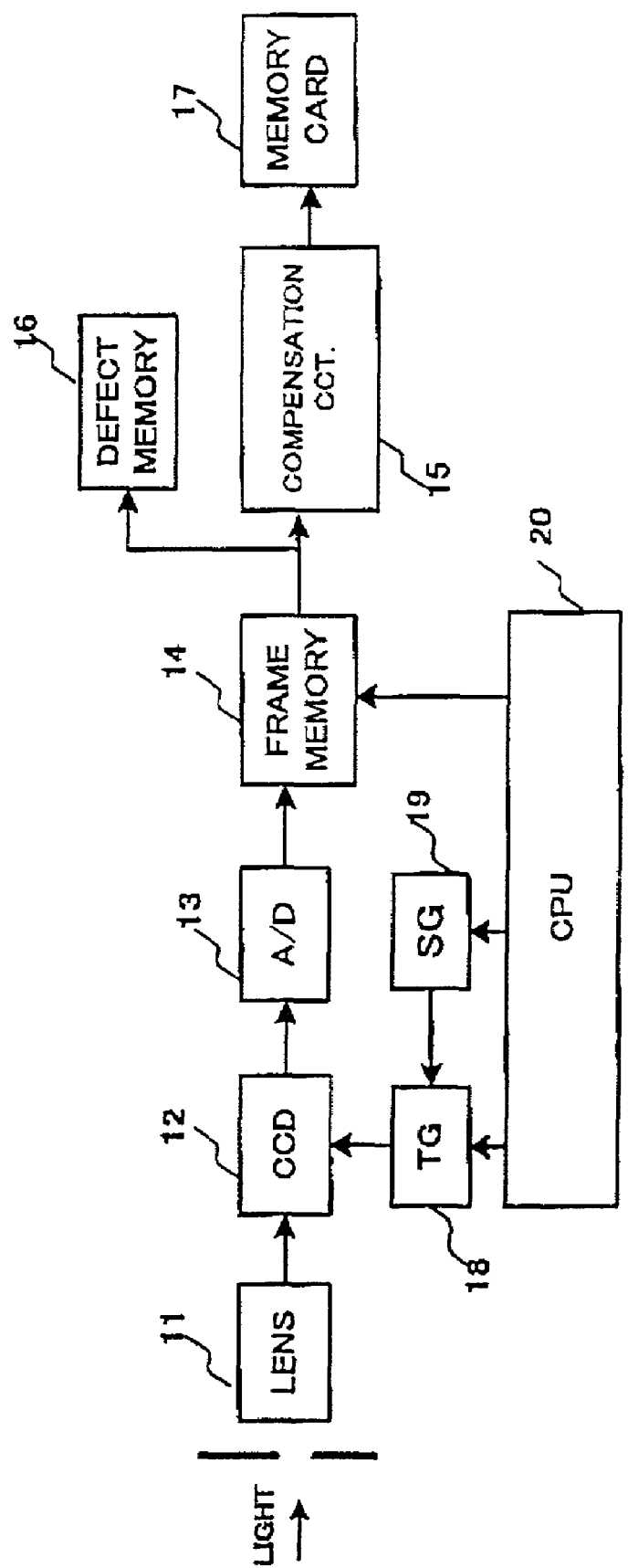
FIG. 1 is a block diagram showing the basic construction of an embodiment of the present invention applied to a digital camera

FIG. 1 is a block diagram showing the basic construction of an embodiment of the present invention applied to a digital camera.

Referring to the Figure, reference numeral 11 designates an imaging lens for focusing light from the field (object). A CCD imaging element 12 photoelectrically converts the field image focused by the lens. An A/D converter 13 converts the output image signal (analog signal) from the imaging element 12 to digital signal, which is temporarily stored in a frame memory 14. The image signal stored in the frame memory 14 is fed to a defect compensation circuit 15. Data representing addresses of defecting elements present in the CCD imaging element 12 are preliminarily stored in a defect memory 16, which is constituted by an EEPROM or the like. According to these address data, portions corresponding to defect elements are compensated, i.e., subjected to an image defect compensating process. An image signal which is obtained as a result of the image defect compensating process is stored in a memory card 17. The CCD imaging element 12 constitutes a photoelectric converting part as an essential element of the present invention, which is a two-dimensional array of a plurality of pixels aligned in horizontal and vertical directions in the image pick-up area.

The digital camera further comprises a timing generator (TG) 18 for controlling the timing of driving the CCD imaging element 12, a signal generator (SG) 19 for driving the TG 18 and a CPU 20 for controlling the entire system of the digital camera including the CCD imaging element 12, the frame memory 14, the TG 18 and the SG 19, as noted above.

The system of this embodiment is constructed such as to be set in a first read-out mode, in which photoelectric conversion outputs are read out fully from all pixels of the photoelectric conversion part, or a second read-out mode, in which concerning either the horizontal or the vertical array of pixels outputs are read out intermittently while concerning the other array all outputs thereof are read out, so as to obtain outputs from selected and limited pixels of the photoelectric conversion part. Outputs are thus read out from the pertinent pixels in either mode. More specifically, in the first read-out mode which is so-called full read-out mode, the outputs are read out from pixels in the two-dimensional array in horizontal and vertical directions sequentially one horizontal line after another. In the second read-out mode which is so-called thinning-out read-out mode, outputs are read out by thinning out every other horizontal line.

Figure 2:
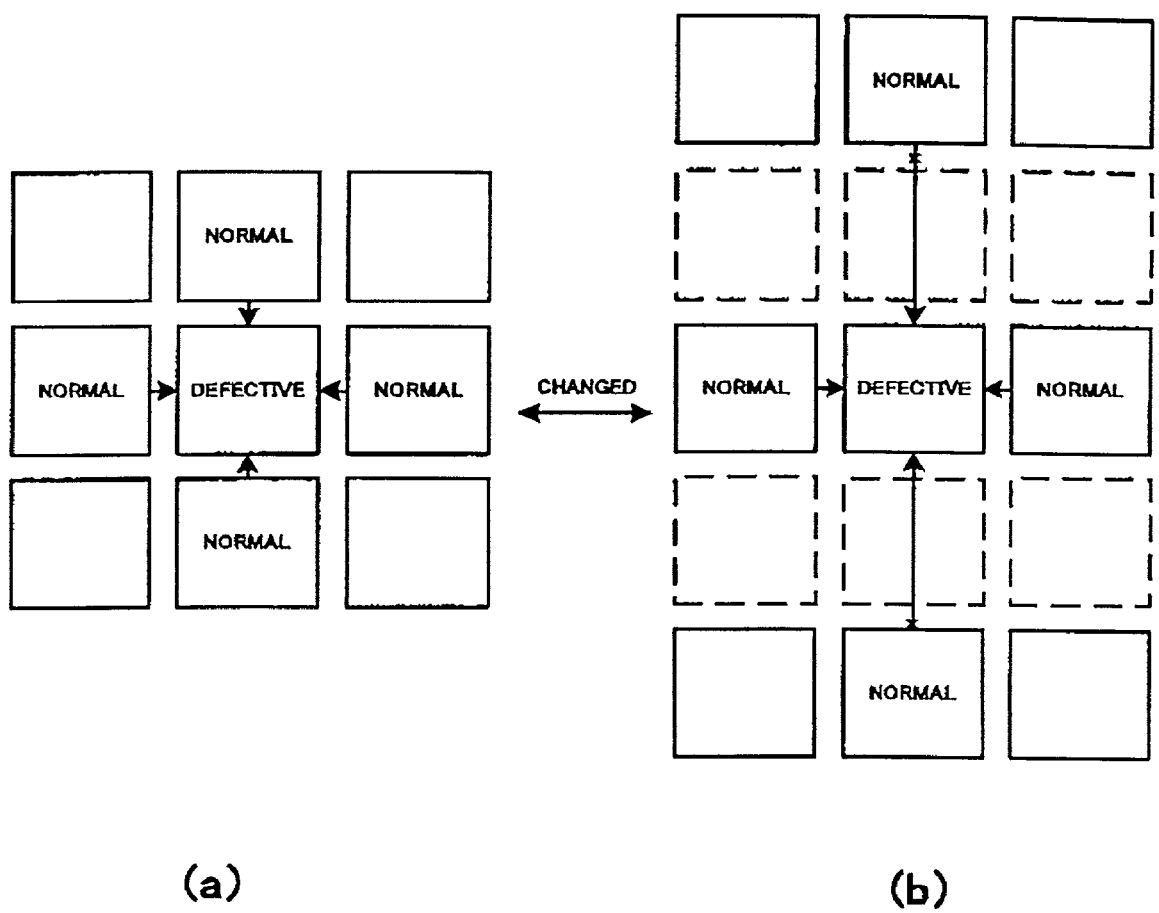
FIGS. 2(a) and 2(b) are conceptional views illustrating defective pixel compensation methods in full read-out and thinning-out read-out modes.

FIGS. 2(a) and 2(b) are conceptual views illustrating defective pixel compensation methods in full read-out and thinning-out read-out modes.

As shown in FIG. 2(a), in the full read-out mode the defective pixel compensation is executed in an interpolation process based on data of four adjacent pixels. In this process, signals of two normal pixels adjacent to the defective pixel in the horizontal line and two normal pixels adjacent to the defective pixel in the vertical line are added together, and the sum result (or more strictly the average value of the photoelectric outputs of the four normal pixels) is substituted for the signal of the defective pixel.

As shown in FIG. 2(b), in the horizontal thinning-out read-out mode the defective pixel compensation is executed by an interpolation process based on data of two adjacent pixels in the horizontal direction. In this process, the signals of the two normal pixels adjacent to the defective pixel in the vertical line direction are not added, but only the signals of the two normal pixels adjacent to the defective pixel in the horizontal line direction are added, and the sum result (or more strictly the average value of the photoelectric conversion outputs of the two normal pixels) are substituted for the signal of the defective pixel. This is executed so because if in the thinning-out read-out mode the signals of the four adjacent pixels are added as in the full read-out mode, the obtainable correlation is too low to obtain accurate defective pixel compensation due to the great distance of the normal pixel positions in the vertical direction.

As noted before, in the case of the color imaging element the term "adjacent to" has a meaning pertinent to pixels, which are pixels of the same color as the color of the defective pixel (i.e., pertinent color to the position of the defective pixel) and adjacent to the defective pixel in the horizontal or vertical direction. Also, as noted before, although pixels which are physically closest to the defective pixel are usually of different colors from the color of the defective pixel, the term "adjacent to" is applied to such physically closest pixels of the same color as the defective pixel.

Figure 3:
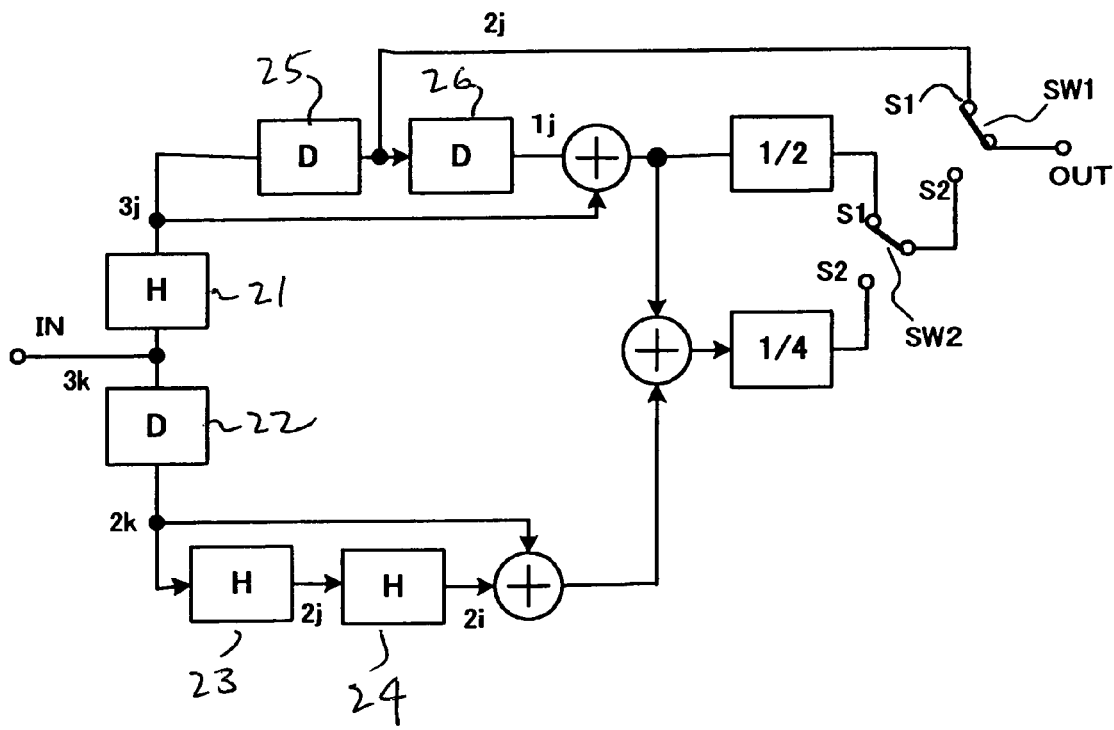
FIG. 3 is a schematic showing of a circuit construction for executing defective pixel compensation and compensation mode switching in the embodiment of the present invention; an FIG. 4 is a schematic view showing nine pixels centered on a defective pixel in the horizontal and vertical directions.

FIG. 3 is a schematic showing of a circuit construction for executing defective pixel compensation and compensation mode switching in the embodiment of the present invention. Referring to FIG. 3, designated at D are one-clock delays, (i.e., delays for one pixel in the horizontal direction), designated at H are 1-H delays (i.e., delays for one horizontal line), designated at + is an adder, designated at ½ and ¼ are dividers, and designated at SW1 and SW2 are switches.

Figure 4:
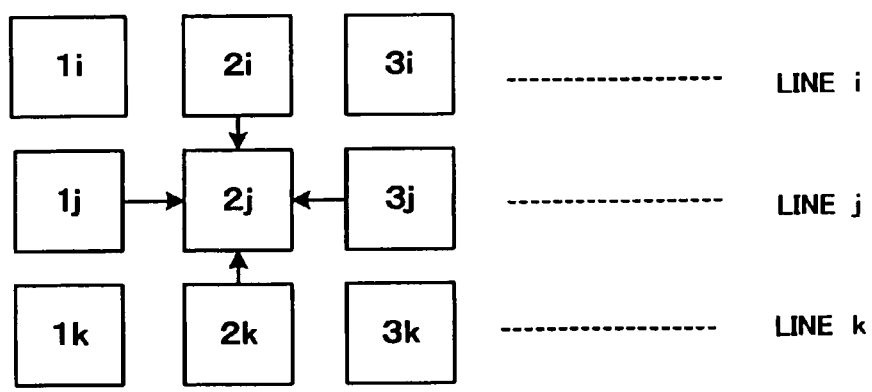

FIG. 4 is a schematic view showing nine pixels centered on a defective pixel in the horizontal and vertical directions. In FIG. 4, designated at 2j is the defective pixel, on which the nine pixels are centered in the horizontal and vertical lines. Pixels 1i to 3i are provided in horizontal line i, pixels 1j to 3j are provided in horizontal line j, and pixels 1k to 3k are provided in horizontal line k. Pixel signals (i.e., photoelectric conversion outputs) are read out in the order of pixels 1i, 2i, 3i, . . . , 1j, 2j, 3j, . . . 1k, 2k, 3k, . . . .

Referring to FIG. 3, it is now assumed that the pixel signal 3k is fed to an input terminal IN. In this case, the output 3j is provided from the 1-H delay H21, to which the input signal 3k is fed. Also, the output 2j is provided from the one-clock delay D25, to which the output 3j is fed, and the output 1j is provided from the one-clock delay D26, to which the output 2j is fed. Furthermore, the output 2k is provided from the one-clock delay D22, to which the input signal 3k from the input terminal IN is fed. The output 2j is further provided from the 1-H delay H23, to which the output 2k is fed, and the output 2l is provided from the 1-H delay H24, to which the output 2j is fed.

Thus, when the switch SW1 is in contact S1 side state, the pixel signal 2j appears from output terminal OUT. This pixel signal 2j is free from any interpolation process, that is, it is of a normal pixel free from any pertinent defective pixel. When the switches SW1 and SW2 are in S2 and S1 side states, respectively, the signals 1j and 3j are added together, and the ½ divider output is obtained as interpolation output based on the two adjacent pixels in the horizontal line direction. When the switches SW1 and SW2 are both in contact S2 side states, the signals 1j, 3j, 2k and 2l are added together, and the ¼ divider output is obtained as interpolation output based on the four adjacent pixels in the horizontal and vertical in directions.

As shown above, the execution and non-execution of defective pixel compensation can be switched by switching the switch SW1, and the addition of the two adjacent pixels in the horizontal line direction (i.e., averaging process based on the sum) and addition of the four adjacent pixels in the horizontal and vertical line directions (i.e., averaging process based on the sum) can be switched by switching the switch SW2. Thus, in the case of the full read-out mode, the switches SW1 and SW2 are both set in the S2 contact side states for the addition of the four adjacent pixels in the horizontal and vertical line directions (i.e., averaging process based on the sum), while in the thinning-out read-out mode the switches SW1 and SW2 are set in the contact S2 and S1 side states, respectively, for the addition of the two adjacent pixels in the horizontal line direction (i.e., averaging process based on the sum). In either mode, appropriate defective pixel compensation is obtainable.

While one embodiment of the present invention has been described, it is by no means limitative. For example, in the above embodiment the thinning-out read out mode has been described in connection with the example of thinning out every other horizontal line, the present invention is also applicable to the case of thinning out every two horizontal lines. The present invention is further applicable to a vertical line thinning-out read-out mode, in which not a horizontal line or lines but a vertical line or lines are thinned out. In this case, the defective pixel compensation may be executed by using normal pixels, which are adjacent to a defective pixel in the vertical line direction.

Also, the circuit construction for the defective pixel compensation as shown in FIG. 3 is by no means limitative, and adequate changes and modifications are possible in dependence on specifications. Furthermore, the imaging element is not limited to the CCD, but it is possible to adopt a CMOS sensor as well. Moreover, various other changes and modifications may be made without departing from the scope of the present invention.

As has been described in the foregoing, according to the present invention it is possible to realize a system for and a method of adequate defective pixel compensation process, which can be executed in accordance with the switching of the full and thinning-out read-out modes over to each other.

The invention claimed is:

1. A defective pixel compensation system, comprising:
   a photoelectric converter having a two-dimensional array of pixels formed on an image pick-up area and arranged in horizontal and vertical line directions;
   a read-out circuit configured to read out photoelectric conversion outputs from given pixels which, when set in a first read-out mode, fully reads out photoelectric conversion outputs of all pixels in the photoelectric converter, and when set in a second read-out mode, reads out photoelectric conversion outputs of pixels in one of the horizontal and vertical line directions intermittently and reads out photoelectric conversion outputs of all pixels in the other one of the horizontal and vertical line directions; and
   a defective pixel compensation portion configured such that when the read-out circuit is set in the first read-out mode for reading out photoelectric conversion outputs, the compensation portion executes a predetermined defective pixel compensation process for defective pixel outputs on the basis of the photoelectric conversion outputs of pixels including pixels adjacent to a defective pixel in both the horizontal and vertical line directions, and when the read-out portion is set in the second read-out mode for reading out photoelectric conversion outputs of selected and limited pixels, the compensation circuit executes a predetermined defective pixel compensation process for defective pixel outputs on the basis of photoelectric conversion outputs of only two pixels which are adjacent to the defective pixel and lie in the other one of the line directions, when the read-out circuit reads out the photoelectric conversion outputs of the selected and limited pixels in the second read-out mode.

2. A defective pixel compensation system, comprising:
   a photoelectric converter with a two-dimensional array of a plurality of pixels corresponding to predetermined colors, respectively, formed on an image pick-up area and aligned in horizontal and vertical line directions;
   a read-out circuit, which is configured, when set in one of a first read-out mode, fully reads out photoelectric conversion outputs of all pixels in the photoelectric converter, and when in a second read-out mode, reads out photoelectric conversion outputs of pixels in one of the horizontal and vertical line directions intermittently while reading out outputs of all pixels in the other one of the line directions so as to obtain outputs from selected and limited pixels thereof for reading out photoelectric conversion outputs from pertinent pixels in either mode; and
   a defective pixel compensation process circuit configured such that when the read-out circuit is set in the first read-out mode for reading out photoelectric conversion outputs, it executes a predetermined defective pixel compensation process for defective pixel outputs on the basis of the photoelectric conversion outputs of pixels including pixels adjacent to a defective pixel and being of a color pertinent to the defective pixel in the horizontal and vertical line directions, and when the read-out circuit is set in the second read-out mode for reading out photoelectric conversion outputs of limited pixels, it executes a predetermined defective pixel compensation process for defective pixel outputs on the basis of photoelectric conversion outputs of only two pixels adjacent to a defective pixel and being of a color pertinent to the defective pixel and which lie in the other line direction, while limiting line directions of the two-dimensional pixel array.

3. A defective pixel compensation method for an imaging system having a photoelectric converter with a two-dimensional array of a plurality of pixels formed on an image pick-up area arranged in horizontal and vertical line directions, comprising the steps of:
   setting a read-out circuit in one of a first read-out mode, in which the read-out circuit fully reads out photoelectric conversion outputs of all pixels in the photoelectric conversion part, and a second read-out mode, in which the read-out circuit reads out outputs of pixels in one of a horizontal and vertical line direction array intermittently while reading out outputs of all pixels in the other line direction array so as to obtain outputs from selected and limited pixels thereof for reading out photoelectric conversion outputs for pertinent pixels in either mode; and
   causing a defective pixel compensation circuit to execute, when the read-out circuit is set in the first read-out mode for reading out photoelectric conversion outputs, a predetermined defective pixel compensation process for defective pixel outputs on the basis of the photoelectric conversion outputs of pixels including pixels adjacent to a defective pixel in the horizontal and vertical line directions, while executing, when the read-out circuit is set in the second read-out mode for reading out photoelectric conversion outputs of limited pixels, a predetermined defective pixel compensation process for outputs of defective pixels on the basis of photoelectric conversion outputs of pixels limited to only two adjacent pixels to the defective pixel and lying in the same line direction, while limiting the line directions of the two-dimensional pixel array.

4. A defective pixel compensation method for an imaging system having a photoelectric converter with a two-dimensional array of a plurality of pixels corresponding to predetermined colors, respectively, formed on an image pick-up area and arranged in horizontal and vertical line directions, comprising the steps of:

setting a read-out circuit in one of a first read-out mode, in which the read-out circuit fully reads out photoelectric conversion outputs of all pixels in the photoelectric conversion array, and a second read-out mode, in which the read-out circuit reads out outputs of pixels in either the horizontal or vertical line direction intermittently while reading out outputs of all pixels in the other line direction so as to obtain outputs from selected and limited pixels thereof for reading out photoelectric conversion outputs for pertinent pixels in either mode; and causing a defective pixel compensation circuit to execute, when the read-out circuit is set in the first read-out mode for reading out photoelectric conversion outputs, a predetermined defective pixel compensation process for the outputs of defective pixels on the basis of the photoelectric conversion outputs of pixels including adjacent pixels to a defective pixel and being of a color pertinent to the defective pixel in the horizontal and vertical line directions, while executing, when the read-out circuit part is set in the second read-out mode for reading out photoelectric conversion outputs of limited pixels, a predetermined defective pixel compensation process for outputs of defective pixels on the basis of photoelectric conversion outputs of pixels limited to only two adjacent pixels to a defective pixel and being of a color pertinent to the defective pixel and lying in the same line direction, while limiting the line directions of the two-dimensional pixel array.

* * * * *